United States Patent [19]

Moore

[11] 3,955,166
[45] May 4, 1976

[54] PULSE PRODUCING DEVICES
[75] Inventor: John Howard Moore, Redditch, England
[73] Assignee: The Lucas Electrical Company Limited, Birmingham, England
[22] Filed: Sept. 12, 1974
[21] Appl. No.: 505,488

[30] Foreign Application Priority Data
Sept. 15, 1973 United Kingdom............... 43400/73

[52] U.S. Cl............................. 336/79; 123/149 A; 310/168; 336/120
[51] Int. Cl.² .......................................... H01F 21/04
[58] Field of Search ................... 336/73, 75, 77, 79, 336/87, 135, 120; 310/111, 168, 169, 170, 166, 171, 268; 340/196, 199; 323/85; 123/149 R, 149 A

[56] References Cited
UNITED STATES PATENTS
1,582,524   4/1926   Latour................................ 336/79
3,105,212   9/1963   Schwartz............................... 336/87
3,471,844   10/1969  Schugt.............................. 336/87 X
3,890,516   6/1975   Widdowson et al. ............... 310/111

FOREIGN PATENTS OR APPLICATIONS
1,914,854   1/1970   Germany ........................... 336/135

*Primary Examiner*—Thomas J. Kozma
*Attorney, Agent, or Firm*—Andrus, Sceales, Starke & Sawall

[57] ABSTRACT

A pulse producing device has an E-shaped core with an input winding and an output winding, so that flow of flux between the limbs of the core produces an output in the windings. The flow of flux is controlled by parts rotating close to the limbs, and these parts are formed on a rotatable plate the periphery of which is split and deformed to provide two rows of tags, one row passing close to the central limb and one of the outer limbs and the other row passing close to the central limb and the other outer limb.

3 Claims, 2 Drawing Figures

U.S. Patent May 4, 1976 3,955,166

PULSE PRODUCING DEVICES

This invention relates to pulse producing devices.

A device according to the invention comprises in combination an E-shaped core having thereon an input winding and an output winding, one of said windings being mounted on the central limb of the core and the other winding being formed in two parts on the outer limbs of the core respectively, and a rotatable plate which at its periphery is split and deformed to provide two rows of tags, the tags in one row passing close to the central limb and one of the outer limbs of the core as the plate rotates, and the tags in the other row passing close to the central limb and the other outer limb of the core as the plate rotates, the input winding being connected in use to an a.c. supply, and the tags modifying the flux flow between the limbs of the core so as to produce an output in the output winding of a nature dependent upon the angular position of the plate.

Figure 1:
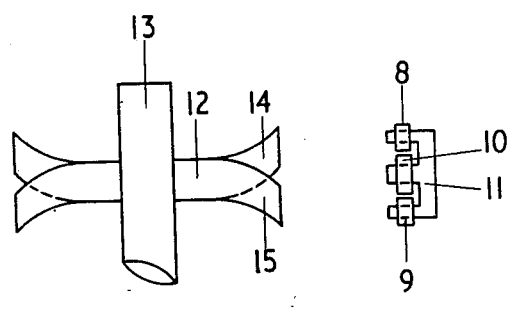
Figure 2:
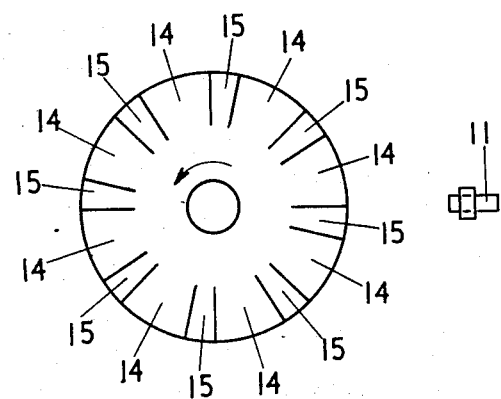

An example of the invention is illustrated in the accompanying drawings, in which FIG. 1 is a sketch of one arrangement, and FIG. 2 is a plan of FIG. 1.

Referring to the drawings, there is provided an E-shaped core 11 having an input winding 10 mounted on its central limb and an output winding 8, 9 mounted in two parts on its outer limbs. The two parts 8, 9 of the output winding are in series opposition, and provided there is an even flow of flux from the central limb to the outer limbs, there will be no output in the output winding.

There is further provided an aluminium plate 12 which is mounted for rotation about a shaft 13 extending at right angles to the limbs of the core 11. As shown in FIG. 2, the plate 12 is split radially, and two rows of tags 14 and 15 are bent up from the plate. After the tags have been bent up, the assembly is machined such that the tips of the tags lie on a common circular cylinder co-axial with the original axis of the plate. The tags 14 pass close to the central limb and one of the outer limbs of the core 11 as the plate 12 rotates, and the tags 15 pass close to the central limb and the other outer limb. As each tag passes close to the core 11, it disturbs the flow of flux, and so an output signal is obtained, where phase will depend on whether tags 14 or 15 are passing close to the core. It will be appreciated that no output will be obtained where the splits occur due to the instantaneous symmetrical disposition of the tags with respect to the E core.

In the particular example, the pulses produced are responsible for initiating the spark discharge in an internal combustion engine having eight cylinders. Eight tags 14 and eight tags 15 are bent up from the disc 12. Consequently, when each tag 14 or 15 passes close to the E core a null and phase change is obtained either of which may be used to initiate the spark discharge. When passing back to the original tags 15 or 14, a second null and phase change is obtained and these may be used to initiate the energy storage cycle within the ignition system prior to its release as the next spark. The actual way in which the signals in the windings 8, 9 and 10 are used is known in itself, and so is not described in any great detail.

In a modification, the tags of each set are of uniform circumferential width, so that the pulses obtained from the device can be used to represent the angular position of the rotor starting from a datum position, or can be used to measure the speed of the rotor.

I claim:

1. A pulse producing device comprising in combination an E-shaped bore having thereon an input winding for connection to an a.c. supply and an output winding, one of said windings being mounted on the central limb of the core and the other winding being formed in two parts on the outer limbs of the core respectively, and a rotatable plate which is formed of a conductive, non-magnetic material and which at its periphery is split and deformed to provide two rows of tags, the tags in one row passing close to the central limb and one of the outer limbs of the core as the plate rotates, and the tags in the other row passing close to the central limb and the other outer limb of the core as the plate rotates, the tags thereby modifying the flux flow between the limbs of the core as the plate rotates, when the input winding is connected to said supply, so as to produce an output in the output winding of a nature depending upon the angular position of the plate.

2. A device as claimed in claim 1 arranged for use in an internal combustion engine spark ignition system wherein said rows of tags each include a number of tags equal to the number of cylinders of the engine.

3. A device as claimed in claim 1 wherein the tags of each row are of uniform circumferential width.

* * * * *